United States Patent
Maciejewski et al.

(10) Patent No.: US 6,227,613 B1
(45) Date of Patent: May 8, 2001

(54) VEHICLE WITH A SLIDING FABRIC ROOF AND A FRONT SPOILER THEREON

(75) Inventors: Bernhard Maciejewski; Thomas Drescher, both of Gifhorn; Andreas Babel, Calberlah, all of (DE)

(73) Assignee: Volkswagen AG., Wolfsburg (DE)

( * ) Notice: Subject to any disclaimer, the term of this patent is extended or adjusted under 35 U.S.C. 154(b) by 0 days.

(21) Appl. No.: 09/402,153
(22) PCT Filed: Feb. 20, 1998
(86) PCT No.: PCT/EP98/00993
  § 371 Date: Sep. 29, 1999
  § 102(e) Date: Sep. 29, 1999
(87) PCT Pub. No.: WO98/43844
  PCT Pub. Date: Oct. 8, 1998

(30) Foreign Application Priority Data

Mar. 29, 1997 (DE) .............................................. 197 13 321

(51) Int. Cl.[7] ....................................................... B60J 7/22
(52) U.S. Cl. ............................................. 296/217; 296/219
(58) Field of Search .................................... 296/219, 217, 296/180.1

(56) References Cited

U.S. PATENT DOCUMENTS 2,991,094 * 7/1961 Baier et al. ...................... 296/219 X
5,836,643 * 11/1998 Preiss ................................... 296/217

FOREIGN PATENT DOCUMENTS

4012569 * 5/1991 (DE) ..................................... 296/217
4126568 * 2/1993 (DE) ..................................... 296/217
  90433 * 4/1988 (JP) ..................................... 296/217

* cited by examiner

*Primary Examiner*—Dennis H. Pedder
(74) *Attorney, Agent, or Firm*—Cohen, Pontani, Lieberman & Pavane

(57) ABSTRACT

A vehicle, having a fixed roof having an opening therein, a fabric sliding roof arranged at the opening in the fixed roof so as to be slidable between an open position and a closed position, a spoiler arranged on the fixed roof in a region of a front edge of the sliding door so as to extend transversely over the vehicle for reducing draft and noise phenomena in an interior of the vehicle when the fabric sliding roof is open, the spoiler having at least one passage opening configured to receive some of an air stream striking against the spoiler during movement of the vehicle in a direction of travel, and a deflecting device arranged in a rearward region of the spoiler relative to the direction of travel so as to affect air flow near the spoiler, the deflecting device being an essentially upwardly extending part.

6 Claims, 2 Drawing Sheets

VEHICLE WITH A SLIDING FABRIC ROOF AND A FRONT SPOILER THEREON

BACKGROUND OF THE INVENTION

1. Field of the Invention

The invention relates to a vehicle having a sliding roof with a spoiler as is disclosed in DE-B-1 008 592.

2. Discussion of the Prior Art

When the concept of using a simple spoiler, which is successful in a certain type of vehicle, is transferred to other types of vehicle, it has emerged that the draft and noise phenomena cannot always be satisfactorily reduced with it. The success is dependent to a greater or lesser extent on the particular shape of the body and on other factors. Spoilers which are disclosed in DE-B-1 008 492, which forms the generic type, have a passage opening and show an improvement to this problem.

The aim of all spoilers of this type is to reduce the noises which are also known as drumming and which may occur when the fabric sliding roof is partially or completely open.

SUMMARY OF THE INVENTION

The invention is based on the object of improving a vehicle of the generic type in respect of achieving this object using simple means. Pursuant to this object, and others which will become apparent hereafter, one aspect of the present invention resides in a vehicle comprised of a fixed roof with an opening therein, a fabric sliding roof arranged at the opening in the fixed roof so as to be slidable between an open position and a closed position, and a spoiler arranged on the fixed roof in a region of a front edge of the sliding roof so as to extend transversely over the vehicle for the purpose of reducing draft and noise phenomena in the interior of the vehicle when the sliding roof is open. The spoiler has at least one passage opening configured to receive some of the air streams striking against the spoiler during movement of the vehicle in a direction of travel. A deflecting device is arranged in a rearward region of the spoiler relative to the direction of travel. The deflecting device affects the air flow near the spoiler and is designed as an essentially upward extending part.

In another embodiment of the invention the deflecting device is integrally formed on an upper edge of the spoiler.

In still a further embodiment of the deflecting device is arranged on the fixed roof between the passage opening in the spoiler and the front edge of the sliding roof.

In still another embodiment the upwardly extending part is formed integrally on the upper edge of the spoiler as a projection in the form of a bead.

Yet a further embodiment of the invention provides that the deflecting device arranged between the passage opening and the front edge of the sliding roof is designed as a web which forms a component of the spoiler.

In still yet another embodiment of the invention, the upper edge of the web is integrally formed on the upper edge of the spoiler so as to lie in the continuation of the contour of that section of the spoiler which is situated in front of it.

BRIEF DESCRIPTION OF THE DRAWING

The invention is explained in more detail using three exemplary embodiment and referring to the drawing, in which.

DETAILED DESCRIPTION OF THE PREFERRED EMBODIMENTS

Figure 1:
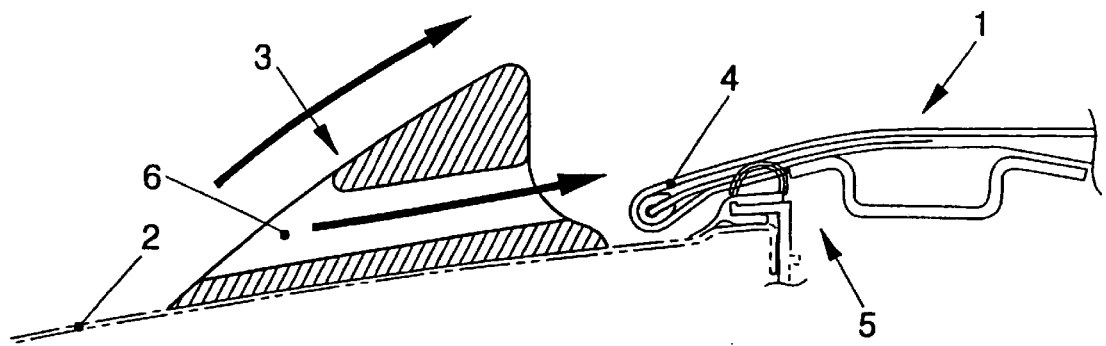
FIG. 1 shows a longitudinal section through the vehicle roof in the front region of the closed fabric sliding roof, with the spoiler arranged in front of it, in a first embodiment.
Figure 2:
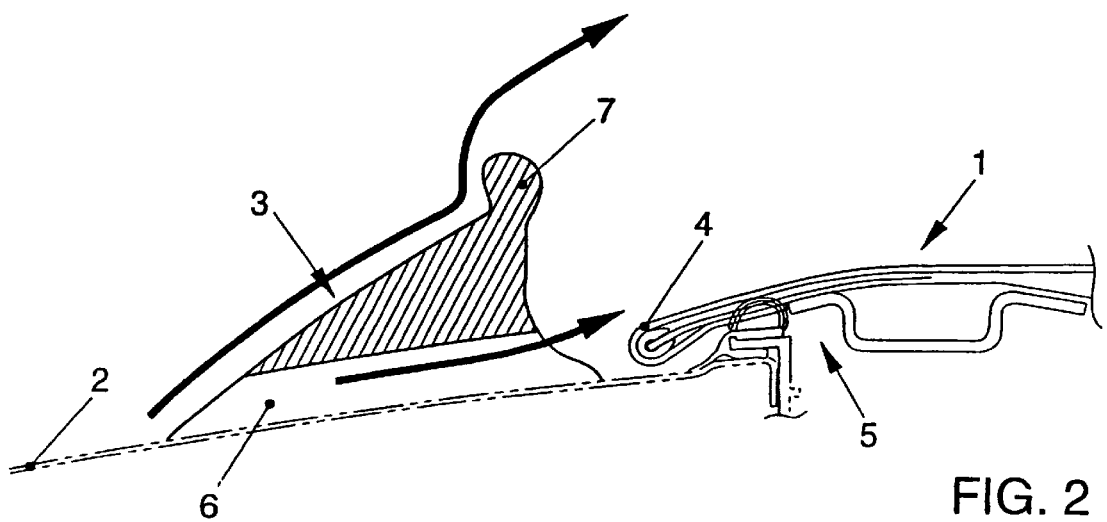
FIG. 2 shows the same region as FIG. 1, but with a spoiler in a second embodiment.
Figure 3:
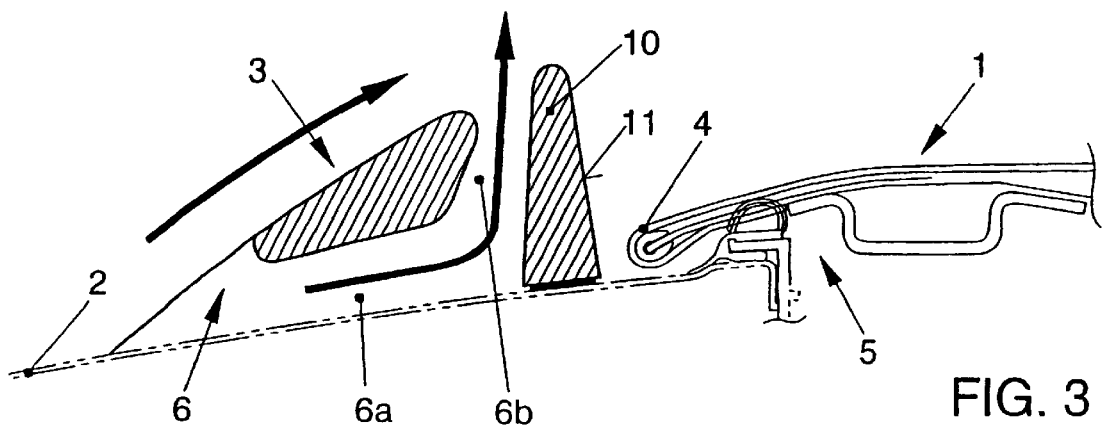
FIG. 3 shows the same region as FIGS. 1 and 2, a third embodiment of the spoiler being shown.

FIGS. 1 to 3 all have in common the front region of a fabric sliding roof 1, which is situated in the closed state, a section, which is situated in front of said sliding roof in the direction of travel, of a fixed vehicle roof 2 and a spoiler 3 which is fastened on said fixed roof 2 and lies at a small distance in front of a front edge 4 of the fabric sliding roof 1 which fits over the roof 2. Means 5 for sealing and fastening the fabric sliding roof 1 can be seen between the fabric sliding roof 1 and the roof 2. The spoiler 3 improves the flow of air around the vehicle in the roof region shown. The wind noises, when the fabric sliding roof 1 is closed, and, in addition, the draft phenomena, when the fabric sliding roof 1 is open, are thereby reduced in the interior of the vehicle.

This effect is increased if the spoiler 3 is provided with at least one throughflow opening 6. As a result of this, some of the airstream striking against the spoiler 3 flows through the spoiler 3 and after it exits from the spoiler 3 causes, together with the flow directed away over the spoiler 3, a certain swirling of air behind the spoiler 3.

A further improvement is obtained if the spoiler 3 according to FIG. 2 has, on its upper rear edge, a projection 7 for deflecting the proportion of air flowing away over the upper side of the spoiler 3. In the exemplary embodiment according to FIG. 2, this projection 7 is designed in the form of a bead-like thickening integrally formed on the main body of the spoiler 3.

Figure 4:
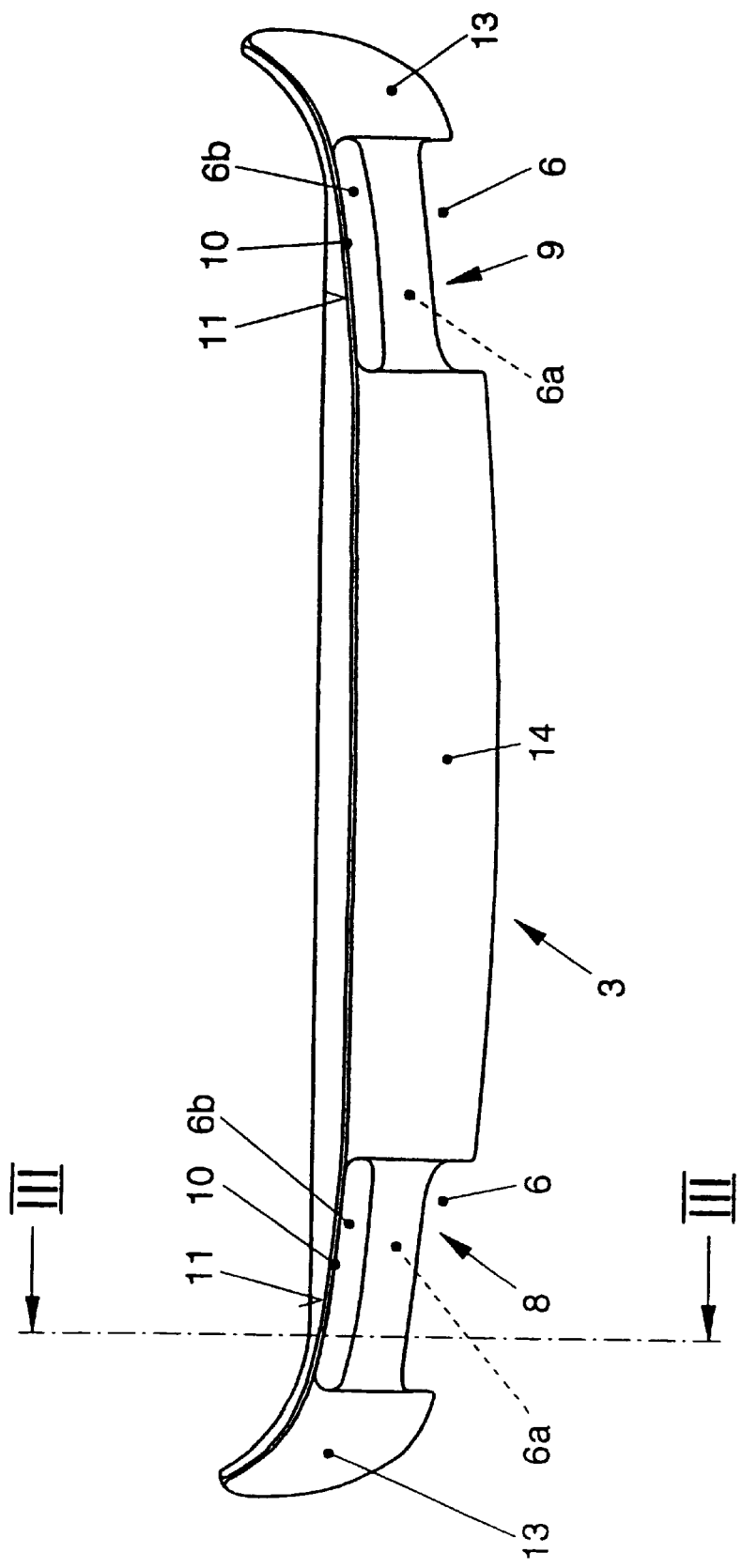
FIG. 4 shows the spoiler corresponding to FIG. 3 in plan view.

A preferred embodiment is shown in FIGS. 3 and 4. In this case, FIG. 3 shows a section corresponding to the intersecting line III—III in FIG. 4, only the planes of section of the spoiler 3 being shown.

The spoiler 3 has two lateral regions 8, 9 each having a throughflow opening 6 which is not continuous in a straight line in this case but rather consists of a first section 6a which is parallel to the roof and of an upwardly directed, second section 6b which adjoins said first section. It is delimited to the rear by a web 10 whose rear side 11 merges flush into the rear side of the spoiler 3. In this embodiment, as also in the case of that embodiment according to FIG. 2, the base of the throughflow opening forms the roof surface, in contrast to the embodiment according to FIG. 1 where the base is part of the spoiler 3 itself. In the present case, the web 10 is a component of the spoiler 3 which although advantageous in terms of manufacturing is not absolutely imperative. Predominantly for visual reasons, the height of the web 10 is selected in such a manner that its upper edge butts against the continued contour of the upperside of the spoiler section situated in front of it. The regions 8, 9 with their throughflow openings 6 are designed such that they are raised with respect to the adjacent regions 13, 14 and adjoin the latter in a well rounded-off manner.

What is claimed is:

1. A vehicle, comprising:
   a fixed roof having an opening therein;
   a fabric sliding roof arranged at the opening in the fixed roof so as to be slidable between an open position and a closed position;

a spoiler mounted in a stationary manner on an outer surface of the fixed roof in a region of a front edge of the sliding roof so as to be outside the opening in the fixed roof in front of the front edge when viewed in a direction of travel, and extend transversely over the vehicle for reducing draft and noise phenomena in an interior of the vehicle when the fabric sliding roof is open, the spoiler having at least one passage opening arranged so a to divide an air stream striking against the spoiler during movement of the vehicle in the direction of travel into a first stream passing through the passage opening and a second stream passing along an upper surface of the spoiler; and a deflecting device arranged in a rearward region of the spoiler relative to the direction of travel so as to influence air flow in one of the first steam and the second stream, the deflecting device being an essentially upwardly extending part.

2. A vehicle as defined in claim 1, wherein the upwardly extending part is integrally formed on an upper edge of the spoiler so as to influence the second stream.

3. A vehicle as defined in claim 1, wherein the deflecting device is arranged on the fixed roof between the passage opening of the spoiler and the front edge of the sliding roof.

4. The vehicle as defined in claim 2, wherein the upwardly extending part integrally formed on the upper edge of the spoiler is a projection formed as a bead.

5. A vehicle as defined in claim 3, wherein the upwardly extending part is a web which forms a component of the spoiler.

6. A vehicle as defined in claim 3, wherein the upwardly extending part is formed as a web having an upper edge which lies in a continuation of a contour of a section of the spoiler situated in front of the web.

* * * * *